(12) United States Patent
Vik

(10) Patent No.: US 8,992,642 B2
(45) Date of Patent: Mar. 31, 2015

(54) FUEL PROCESSING SYSTEM WITH TEMPERATURE-CONTROL FLUID CIRCUIT

(75) Inventor: Arild Vik, Blomsterdaien (NO)

(73) Assignee: Prototech AS (NO)

( * ) Notice: Subject to any disclaimer, the term of this patent is extended or adjusted under 35 U.S.C. 154(b) by 1354 days.

(21) Appl. No.: 11/920,138

(22) PCT Filed: May 11, 2006

(86) PCT No.: PCT/GB2006/001727
§ 371 (c)(1),
(2), (4) Date: Dec. 16, 2008

(87) PCT Pub. No.: WO2006/120450
PCT Pub. Date: Nov. 16, 2006

(65) Prior Publication Data
US 2009/0104483 A1    Apr. 23, 2009

(30) Foreign Application Priority Data

May 11, 2005 (GB) .................................. 0509670.6

(51) Int. Cl.
*C01B 3/36* (2006.01)
*H01M 8/06* (2006.01)
*C01B 3/38* (2006.01)
*H01M 8/04* (2006.01)

(52) U.S. Cl.
CPC ............. *H01M 8/0631* (2013.01); *C01B 3/384* (2013.01); *H01M 8/04022* (2013.01); *H01M 8/0618* (2013.01); *C01B 2203/0233* (2013.01); *C01B 2203/066* (2013.01); *C01B 2203/0811* (2013.01); *C01B 2203/1614* (2013.01); *H01M 2250/20* (2013.01); *Y02E 60/50* (2013.01); *Y02T 90/32* (2013.01)
USPC ..................................... 48/197 R

(58) Field of Classification Search
CPC ............... B01J 2219/2462; B01J 2219/2464; B01J 19/249; B01J 2219/2453; B01J 2219/2458; B01J 2219/2465; B01J 2219/2481; B01J 2219/2493; B01J 12/007; B01J 2208/00309; B01J 2208/022; B01J 2219/2479; B01J 2208/0053; B01J 2219/2459
USPC ........................... 48/61–118.5, 127.1, 127.9, 48/197 R–197 A; 422/129–242; 429/400–535
See application file for complete search history.

(56) References Cited

U.S. PATENT DOCUMENTS

| | | | | |
|---|---|---|---|---|
| 4,902,484 A | * | 2/1990 | Martin et al. | 422/625 |
| 5,180,561 A | * | 1/1993 | Morishima et al. | 422/643 |
| 5,670,269 A | * | 9/1997 | Hamada et al. | 429/415 |
| 5,753,194 A | * | 5/1998 | Heil et al. | 422/629 |
| 6,033,634 A | * | 3/2000 | Koga | 422/198 |
| 6,159,434 A | * | 12/2000 | Gonjo et al. | 422/626 |
| 6,187,066 B1 | * | 2/2001 | Benz et al. | 48/127.9 |

(Continued)

*Primary Examiner* — Imran Akram
(74) *Attorney, Agent, or Firm* — Banner & Witcoff, Ltd.

(57) ABSTRACT

An integrated reformer and combustion apparatus for use in a fuel cell system comprises at least one reformer plate (3) at which in use a reforming reaction can take place and at least one combustion plate (1) at which in use a combustion reaction can take place. The plates are arranged in a stack such that the reformer plates (3) and combustion plates (1) are interspersed. The apparatus is arranged such that in use a reforming reaction and a combustion reaction can take place simultaneously, the combustion reaction providing heat for the reforming reaction. A further fluid circuit (19, 29) may be provided in thermal communication with at least one of the reformer unit and the combustion unit so as to allow the temperature of that unit to be controlled.

19 Claims, 7 Drawing Sheets

(56) References Cited

U.S. PATENT DOCUMENTS

| | | |
|---|---|---|
| 6,447,736 B1 | 9/2002 | Autenrieth et al. |
| 6,495,276 B1 * | 12/2002 | Brauchle et al. ............... 429/420 |
| 2001/0018140 A1 * | 8/2001 | Hermann et al. ................ 429/20 |
| 2002/0102188 A1 * | 8/2002 | Hsu et al. ....................... 422/168 |
| 2002/0168308 A1 | 11/2002 | Loffler et al. |
| 2004/0020125 A1 | 2/2004 | Retallick et al. |
| 2004/0148861 A1 * | 8/2004 | Brundage et al. ............ 48/198.3 |
| 2005/0014040 A1 * | 1/2005 | Kaye ................................ 429/20 |
| 2005/0204626 A1 * | 9/2005 | Podhorsky et al. .......... 48/127.9 |
| 2007/0000173 A1 * | 1/2007 | Boe et al. ..................... 48/197 R |

\* cited by examiner

FUEL PROCESSING SYSTEM WITH TEMPERATURE-CONTROL FLUID CIRCUIT

CROSS REFERENCE TO RELATED APPLICATIONS

This application is a National Stage application of co-pending PCT application PCT/GB2006/001727 filed May 11, 2006, which claims the benefit of Great Britain application number 0509670.6 filed May 11, 2005. These applications are incorporated herein by reference in their entireties.

This invention relates to an integrated reformer and combustion apparatus that is suitable for use in fuel cell systems, and methods of reforming a fuel to produce hydrogen using said apparatus.

With the increasing move towards powering cars and other vehicles with fuel cells running on hydrogen, there is an increasing need to provide safe, compact and cost-effective means for supplying hydrogen to fuel cells. Methanol is a preferred source of hydrogen as it can be stored in liquid form. Reformer units that catalytically convert methanol and water to hydrogen for use in fuel cells are known in the art.

Catalytic reforming reactions are endothermic and therefore require external heating. Fuel cell systems comprising integrated reformer and combustion units wherein the reformer unit and combustion unit are in thermal communication are known. In these systems the catalytic combustion of waste gases from the fuel cell provides the heat necessary to maintain the reforming reaction. Known systems comprise tubular reformer and combustion units which occupy a large volume. The known systems do not transfer heat efficiently from the combustion unit to the reformer unit, however. The applicant has realised moreover that known systems do not permit close control of the temperature of the combustion or reforming reactions. Reforming reactions and combustion reactions are both temperature dependent which means that control of the reaction temperatures is required if complete reforming and combustion is to be achieved. Also, if the reaction temperature is too high, catalyst degradation may occur or pollutants such as nitrogen oxides may be produced.

It is an aim of the invention to alleviate some of the above-mentioned drawbacks and when viewed from a first aspect the invention provides an integrated reformer and combustion apparatus for use in a fuel cell system comprising at least one reformer plate at which in use a reforming reaction can take place and at least one combustion plate at which in use a combustion reaction can take place arranged in a stack such that the reformer plates and combustion plates are interspersed, wherein the apparatus is arranged such that in use a reforming reaction and a combustion reaction can take place simultaneously, said combustion reaction providing heat for the reforming reaction.

Thus it will be seen by those skilled in the art that in accordance with the invention the exothermic combustion of waste gases takes place at the combustion plates that are interspersed between plates where the reforming reaction takes place. This means that the heat produced by the combustion is spread throughout the area in which the reforming reaction takes place to provide efficient heat transfer to the reforming reaction. In addition, the reformer plates and combustion plates are stacked together to provide a compact unit that is suitable for use in small vehicles.

Furthermore the applicant has devised an arrangement for alleviating the problem of temperature control. When viewed from a second aspect the invention provides an integrated reformer and combustion apparatus for use in a fuel cell system, said apparatus comprising a reformer unit at which in use a reforming reaction can take place in thermal communication with a combustion unit at which in use a combustion reaction can take place, wherein said apparatus comprises a further fluid circuit in thermal communication with at least one of said reformer unit and said combustion unit so as to allow the temperature of said unit to be controlled.

Thus it will be seen by those skilled in the art that in accordance with the second aspect of the invention means for controlling the temperature of an integrated reformer and combustion unit is provided. When fluid is circulated through the circuit the temperature of the system can be controlled such that the temperature of the combustion reaction and/or the reforming reaction can be controlled and maintained at a relatively constant level. This means that the efficiency of the combustion and reforming reactions can be maximized, and catalyst degradation and the generation of harmful gases can be avoided. By circulating fluid through the circuit the heat transfer between the combustion reaction and the reforming reaction is also improved. The additional circuit provides a way of achieving even closer control of the temperature of the system, however, as fluid having a pre-selected temperature can be circulated through the circuit to prevent fluctuations in temperature that may occur in the combustion or reforming reactions due to changes in the flow rates of gases through the apparatus. The fluid may be heated or cooled externally before it is circulated through the circuit in order to achieve the desired temperature. Alternatively, the temperature of the system can be controlled by varying the flow rate of the fluid through the circuit, or by controlling both the temperature and the flow rate.

In particularly preferred embodiments the integrated reformer and combustion apparatus of the second aspect of the invention is in the form of at least one reformer plate at which in use a reforming reaction can take place and at least one combustion plate at which in use a combustion reaction can take place said plates being arranged in a stack such that the reformer plates and combustion plates are interspersed wherein the apparatus is arranged such that in use a reforming reaction and a combustion reaction can take place simultaneously, said combustion reaction providing heat for the reforming reaction. In accordance with this preferred embodiment, when the apparatus is in use, the heat produced by the combustion reaction taking place at the combustion plates is spread throughout the area in which the reforming reaction is taking place, to provide efficient heat transfer to the reforming reaction.

In preferred embodiments the further fluid circuit comprises at least one tube that extends along at least part of the length of at least one plate. In particularly preferred embodiments, the further fluid circuit comprises tubes that extend along at least part of the length of at least one combustion plate and at least one reformer plate. Preferably each plate comprises at least one tube that forms part of the circuit. According to such embodiments a fluid having an externally predetermined temperature can be circulated to the precise regions where the reforming reaction and combustion reaction take place, which allows for more precise control of the reaction temperatures.

Preferably the reformer plates and combustion plates are arranged such that the reformer plates and combustion plates alternate. This means that the combustion plates are spread evenly between the reformer plates, which allows heat produced by the combustion reaction to be provided to each reformer plate to maintain the reforming reaction taking place at each reformer plate.

In accordance with another preferred feature of the invention, the apparatus is adapted to provide a stream of gas through the apparatus and in contact with the reformer plates and a stream of gas through the apparatus and in contact with the combustion plates wherein the streams are in thermal communication but not in fluid communication. In particularly preferred embodiments, the apparatus is adapted to allow the gas streams flow in opposite directions through the apparatus such that heat exchange between the combustion reaction and reforming reaction can occur.

Preferably the reformer plates and the combustion plates comprise internal manifolds such that when the plates are assembled in a stack the manifolds are arranged to guide the gases over the plates.

Preferably the combustion plate comprises a ceramic combustion catalyst. Suitable catalysts and are well known to the person skilled in the art. The catalyst could be $Pt/\gamma-Al_2O_3$, for example, which is a commercially available combustion catalyst, although any other suitable combination catalyst could be used instead. Preferably the catalyst is provided on one surface of the combustion plate. In preferred embodiments the combustion plate comprises multiple fragments of ceramic catalyst. This allows for improved mixing of the feedstock gases as they come into contact with the combustion catalyst. Large ceramic catalyst structures have also been found to crack during use and this is avoided by using multiple smaller catalyst fragments on each combustion plate.

The reformer plate preferably comprises a reformer catalyst. Preferably the catalyst is suitable for catalyzing the reaction of a fuel and water to produce hydrogen. Preferably the catalyst is provided on one surface of the reformer plate. Suitable reformer catalysts and are well-known to the person skilled in the art. Catalysts comprising copper zinc and aluminium, particularly $Cu/ZnO/Al_2O_3$-type catalysts, are suitable for use in the invention, although any other suitable reforming catalyst could be used instead.

Preferably the reformer catalyst and the combustion catalyst are not in fluid communication.

Preferably the further fluid circuit comprises at least one conduit comprising a thermal transfer surface in thermal communication with the inner wall of the conduit such that an increased effective internal surface area is provided. Preferably said thermal transfer surface comprises a web extending across the interior of the conduit, more preferably it comprises a plurality of webs. In a preferred embodiment the surface is in the shape of a cross. It may be made from any suitably thermally conductive material appropriate to the operating temperature of the apparatus e.g. aluminium for lower temperature applications.

The combustion plates of the invention preferably comprise means for arresting flames located at the gas inlet. Such means for arresting flames are conventional and are well-known to the person skilled in the art.

The invention also provides a fuel cell system comprising an integrated reformer and combustion apparatus as described before, and a fuel cell. Thus, the invention provides a complete fuel cell and fuel processing system preferably suitable for use in small vehicles. Preferably, where provided, the further fluid circuit is thermally integrated with the fuel cell. Equally in aspects/embodiments of the invention in which a further fluid circuit is provided, the further circuit could be integrated with any other form of thermal management unit.

The invention also extends to use of an integrated reformer and combustion apparatus as described above to prepare hydrogen from a fuel and water.

In particular, the invention provides a method of preparing hydrogen from fuel and water using the apparatus of the first aspect of the invention, said method comprising: passing a reformer feedstock comprising fuel and water over the reformer plates such that a reforming reaction takes place to produce a reformer product stream comprising hydrogen, and simultaneously passing a combustible feedstock over the combustion plates such that combustion takes place to produce a combustion product stream, such that the combustion reaction provides heat for the reforming reaction.

Preferably the stream of gas comprising the reformer feedstock and the reformer product stream is in thermal communication but not in fluid communication with the stream of gas comprising the combustion feedstock and combustion product stream. In particularly preferred embodiments the streams of gas move through the apparatus in opposite directions such that efficient heat exchange can occur.

The invention also provides a method of preparing hydrogen from fuel and water using the apparatus of the second aspect of the invention, said method comprising: passing a reformer feedstock comprising fuel and water through the reformer unit such that a reforming reaction takes place to produce a reformer product stream comprising hydrogen, and simultaneously passing a combustible feedstock through the combustion unit such that combustion takes place to produce a combustion product stream, and controlling temperature by circulating a fluid through the additional circuit.

In particularly preferred embodiments the invention provides a method of preparing hydrogen from fuel and water using an integrated reformer and combustion apparatus as described above wherein the apparatus comprises at least one reformer plate and at least one combustion plate arranged in a stack such that the reformer plates and combustion plates are interspersed, the apparatus additionally comprising a fluid circuit in thermal communication with at least one of said reformer plate and said combustion plate; said method comprising: passing a reformer feedstock comprising fuel and water over the reformer plate such that a reforming reaction takes place to produce a reformer product stream comprising hydrogen, and simultaneously passing a combustible feedstock over the combustion plate such that combustion takes place to produce a combustion product stream wherein the combustion provides heat for the reforming reaction; and circulating a fluid through the additional circuit such that the temperature of the system can be controlled.

Any fuel that is suitable for producing hydrogen via a reforming reaction can be used in accordance with the invention. The temperature of the reforming reaction will depend on the nature of the reforming fuel. In one preferred set of embodiments for example, the fuel for the reforming reaction comprises methanol.

When methanol is used as the reformer fuel, the reforming reaction preferably takes place at a temperature of between 150° C. and 250° C., more preferably 180-200° C. The combustion reaction would therefore preferably take place at between 150° C. and 300° C., more preferably 200-250° C.

The temperature of the system is preferably controlled by circulating a suitable fluid through the additional fluid circuit. When methanol is used as the fuel the temperature of the circulating fluid is preferably between 150 and 250° C., more preferably 180-200° C. Oil has been found to be suitable for use in this rage.

In an alternative set of preferred embodiments, the fuel for the reforming reacting comprises at least one of methane, natural gas or diesel. In these embodiments the temperature of the reforming reaction is preferably 350° C. to 850° C., more preferably 500° C. to 700° C. Consequently, the temperature of the combustion reaction should preferably be 400° C. to 900° C., more preferably 550° C. to 750° C. The temperature of the circulating fluid would preferably be to 500° C. to 700° C. Potassium has been found to be suitable for use in this range.

In general, the nature of the fluid used in the additional fluid circuit will depend on the temperature of the reforming reaction, which will itself depend on the nature of the reforming fuel.

Preferably the reformer product stream comprises hydrogen. In particularly preferred embodiments the reformer product stream is provided to a hydrogen-powered fuel cell.

Preferably the combustion feedstock for the methods of the present invention comprises by-products of a hydrogen-powered fuel cell, preferably at least one of hydrogen, hydrocarbons, methanol and carbon monoxide.

A preferred embodiment on the present invention will now be described, by way of example only, with reference to the accompanying drawings in which.

Figure 1:
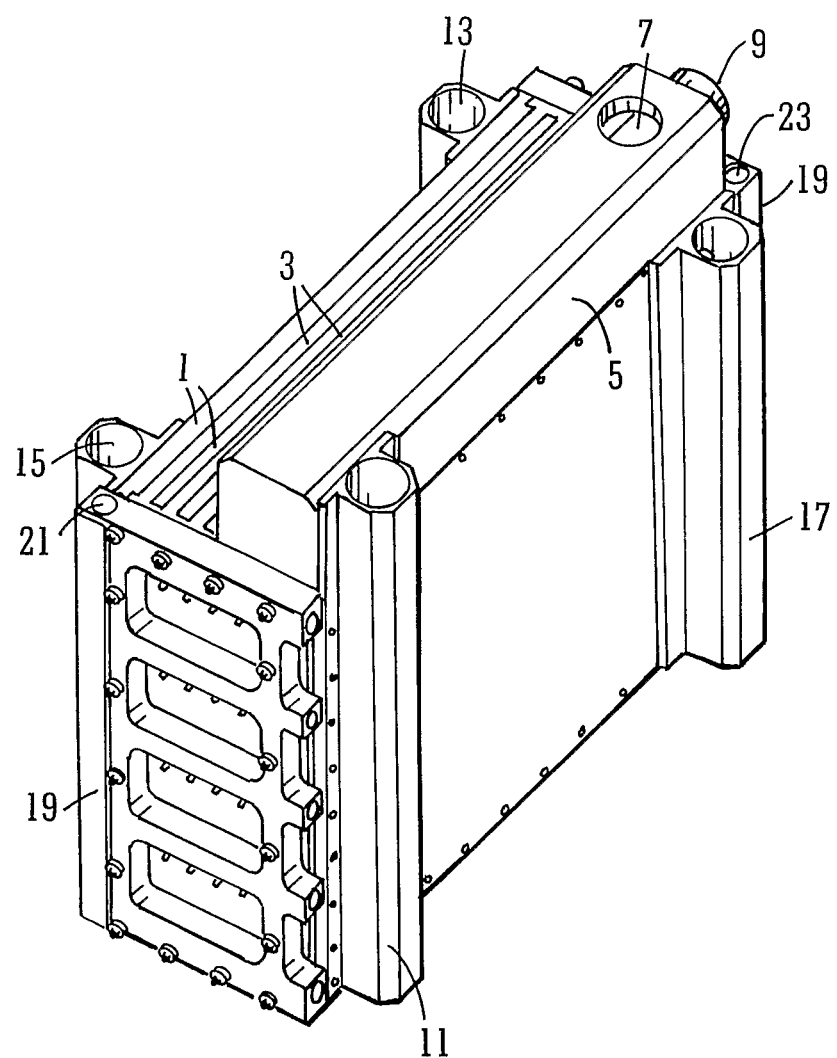
FIG. 1 is a perspective view of an integrated reformer and combustion apparatus in accordance with the invention.

Turning to FIG. 1 there may be seen an integrated reformer and combustion apparatus in accordance with the invention. The apparatus generally comprises a plurality of combustion plates 1 comprising a combustion catalyst, e.g. $Pt/\gamma-Al_2O_3$, on one surface of the plate, and a plurality of reformer plates 3 comprising a reforming catalyst, e.g. $Cu/ZnO/Al_2O_3$, arranged on one surface of the plate; the plates being arranged in a stack such that the reformer plates and combustion plates alternate. The plates may be seen in greater detail in FIGS. 2 and 4.

The plates are provided with internal manifolds 25,33 which allow passage of gas through the apparatus. The apparatus is provided with a number of external manifolds to supply gases to the plates. There is an air/combustible fuel mixer 5 provided with an inlet 7 for air and an inlet 9 for combustible fuel e.g. from the outlet of a fuel cell. The fuel mixer 5 is connected to a combustible fuel inlet manifold 11 which is in gaseous communication with the internal manifolds 33 of the combustion plates (not shown) and therefore able to provide an air/combustible fuel mixture to the combustion catalyst. An exhaust manifold 13 is provided for exhausting the combustion products from the apparatus.

A reformer inlet manifold 15 is provided on the opposite side of the apparatus to the combustible fuel manifold 11. The reformer inlet manifold 15 is in gaseous communication with the internal manifolds 25 of the reformer plates and is able to provide a supply of methanol and water to the reformer catalyst. An reformate outlet manifold 17 is also in gaseous communication with the reformer catalyst to allow the reformed gases to exit.

Two further oil manifolds 19 are provided at opposite sides of the apparatus at the ends of the reformer and combustion plates 1,3. The oil manifolds 19 are in fluid communication with tubes 29 running along the length of the plates (see FIG. 3). The oil manifolds 19 and the tubes 29 running along the length of the plates together form a continuous circuit from an oil inlet 21 to an oil outlet 23.

In view of the temperatures involved when methanol is used as the fuel in the reforming reaction, the apparatus shown could for example be made of aluminium with polymer seals. It will typically be of the order of a few hundred millimeters in size making it suitable for use on an automobile.

Figure 2:
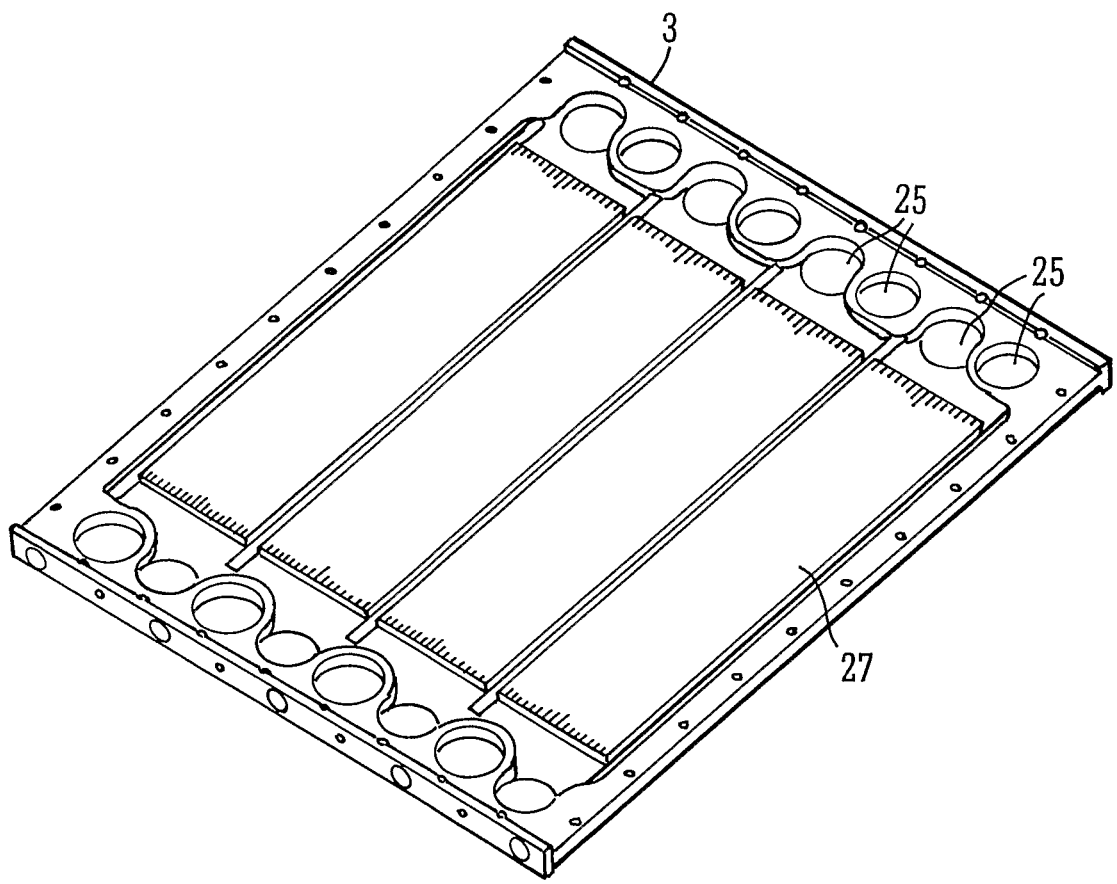
FIG. 2 is a perspective view of a reformer plate used in the apparatus of FIG. 1.

A reformer plate 3 is shown in FIG. 2. The reformer plate is provided with catalytic material 27 on one plate surface. The catalyst is preferably in the form of pellets.

Figure 3:
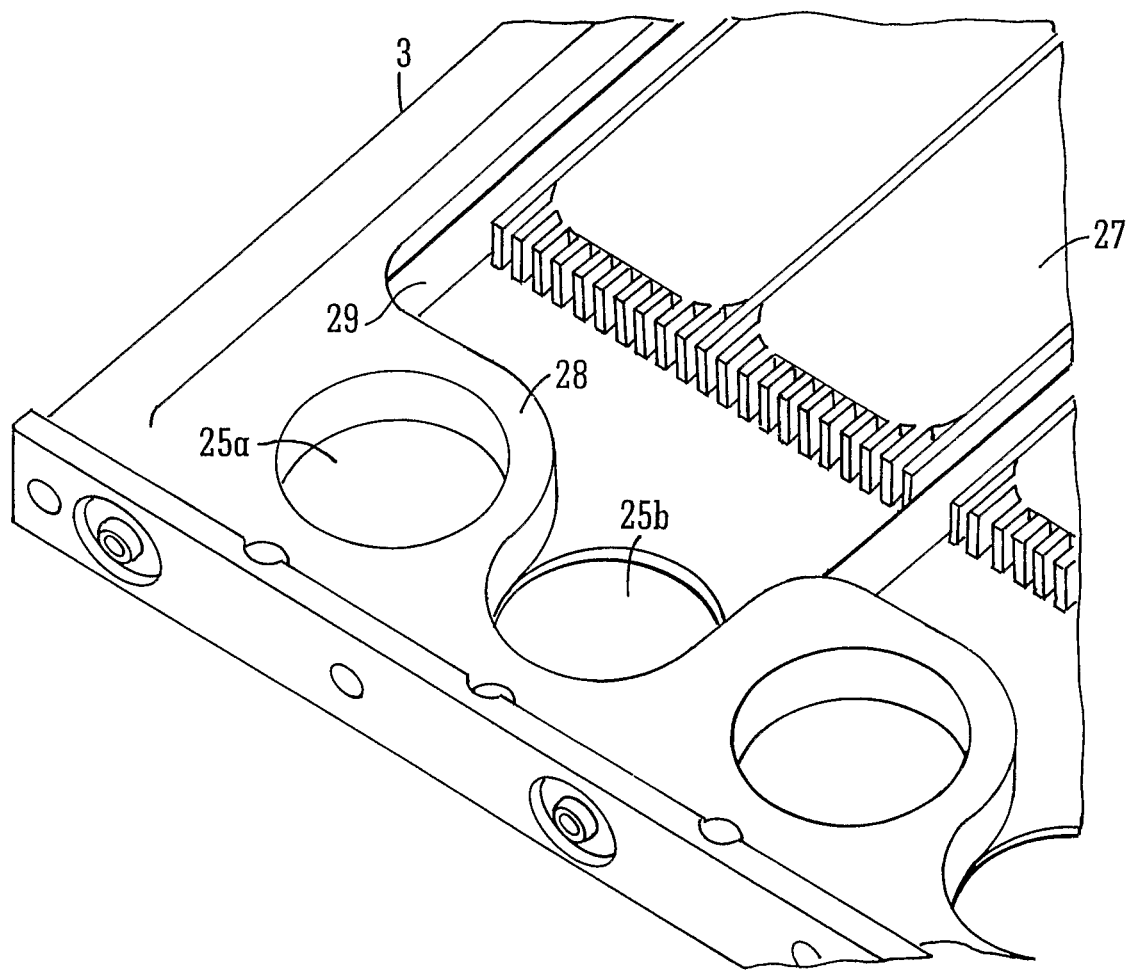
FIG. 3 is an enlarged view of the reformer plate

The reformer plate is provided with rows of internal manifolds 25 along opposite ends of the plate. FIG. 3 shows part of the reformer plate in more detail. The reformer plate is provided with two different types of internal manifold. The first group of manifolds 25a are in gaseous communication with the combustible fuel mixer 5 and the corresponding inlet and exhaust manifolds 11, 13. When the reformer and combustion plates 1,3 are arranged in a stack assembly, a raised wall 28 on the reformer plate prevents the combustible fuel and air mixture from coming into contact with the surface of the reformer plate on which the reformer catalyst 27 is provided.

A second group of internal manifolds 25b are in gaseous communication with the reformer external inlet and outlet manifolds 15 and 17. The second groups of manifolds 25b do not have a raised wall which means gas flowing between the inlet and outlet manifolds 15, 17 passes over the reformer catalyst 27.

The reformer plates 3 also have a plurality of oil tubes 29 extending along the length of the plate. When the apparatus is assembled, the oil tubes 29 tubes are connected at both ends to the external oil manifolds 19.

Figure 4:
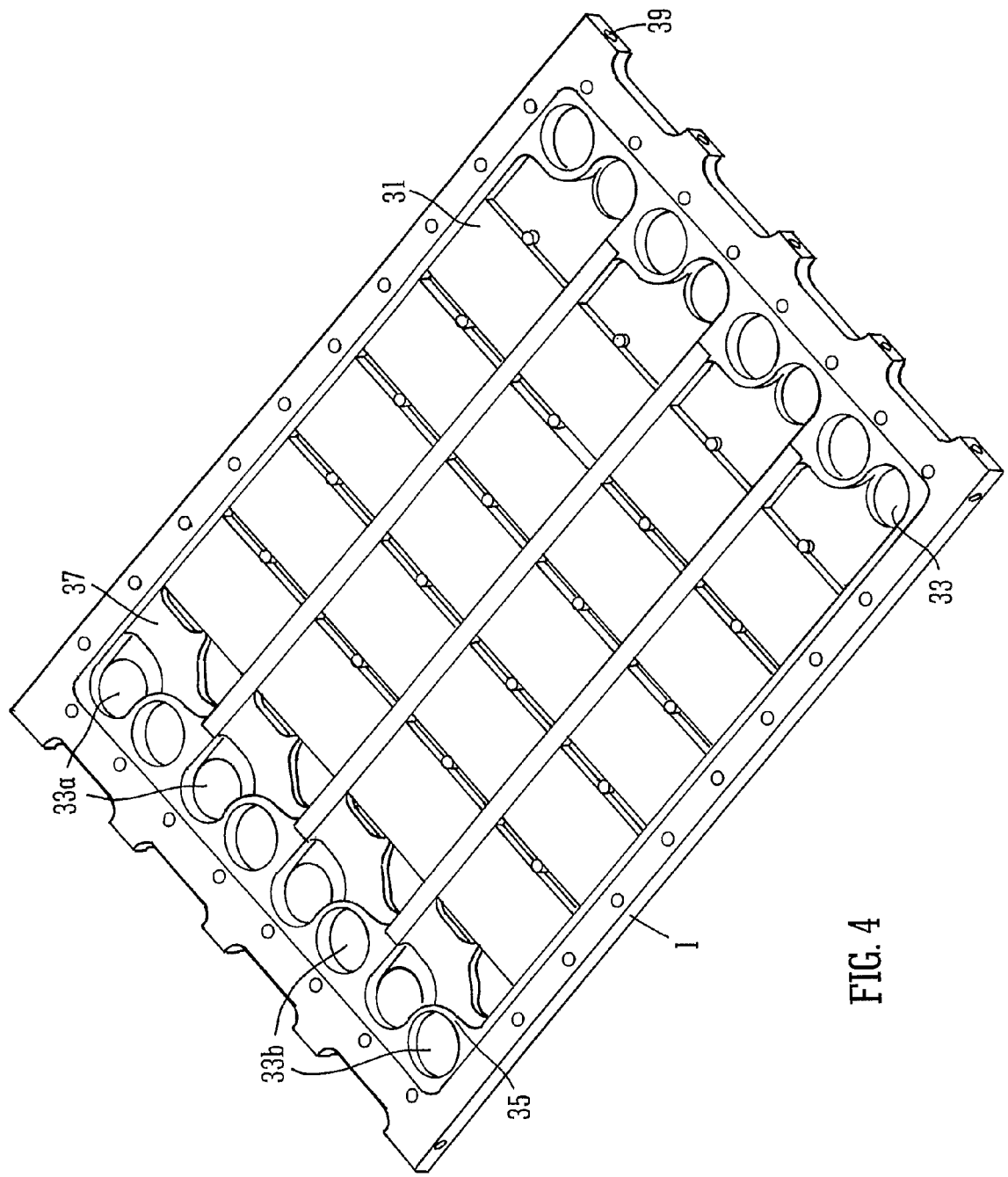
FIG. 4 is a perspective view of a combustion plate used in the apparatus of FIG. 1.

A combustion plate 1 is shown in FIG. 4. A plurality of combustion catalyst structures 31 are arranged on one surface of the plate. The combustion plate is also provided with rows of internal manifolds at each end of the plate arranged into and two different types 33a, 33b. The first group of manifolds 33a are in gaseous communication with the combustion inlet/exhaust manifolds 11, 13 which means that the mixed combustible fuel and air passes over the combustion catalyst on the combustion plate 1. The gases produced by the combustion reaction can be removed via the exhaust manifold 13.

The second group of internal manifolds 33b are in gaseous communication with the reformer inlet and outlet manifolds 15, 17. When the burner plates are arranged in a stack however, a raised wall 35 prevents the flow of reformer feedstock and reformer product stream from coming into contact with the combustion catalyst 31. The combustion plate 1 further comprises flame arrests 37 adjacent to the manifolds 33a,b. The combustion plate 1 also comprises oil tubes 39 that run along the length of the plate and which are connected to the external oil manifolds 19 when the apparatus is assembled.

Figure 5:
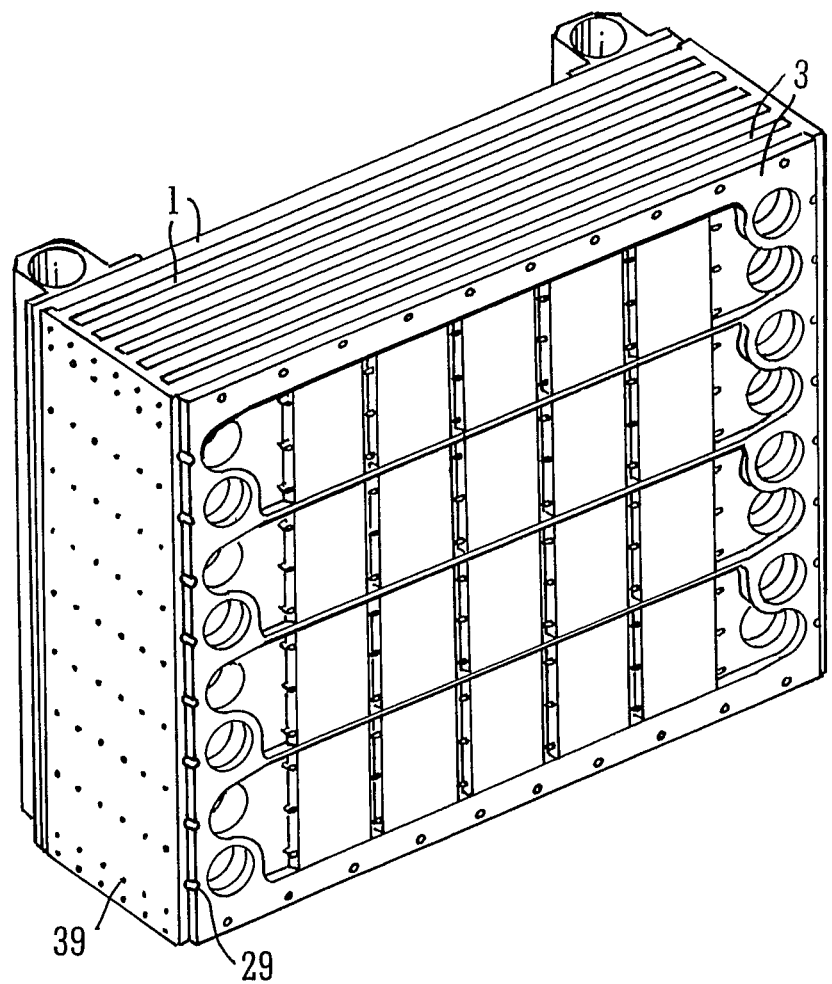
FIG. 5 is perspective view showing an arrangement of combustion plates and reformer plates in accordance with the invention.

FIG. 5 shows alternating combustion plates 1 and reformer plates 3 arranged in a stack, with a reformer plate 3 shown outermost. The plates 1,3 are stacked such that the catalytic surface of each plate 27, 31 faces the non-catalytic surface of the next plate, which means that the reforming catalyst and the combustion catalyst are not in fluid communication. When the plates are stacked together the internal manifolds 25a and 33a align and the internal manifolds 25b and 33b align to provide two separate routes for gas flow through the apparatus. One route allows gas to flow from the fuel mixer, through the combustible fuel inlet manifold 11, over the combustion catalyst 31 on the surface of the combustion plates 1 and to exit at the exhaust manifold 13. The other, separate, route allows gases for reforming to travel from the inlet manifold 15, over the reformer catalyst 27 on the surface of the reformer plates 3 and to exit at the reformate outlet manifold 17. The gases in the two separate routes do not mix. The ends of the fluid tubes 29 and 39 can be seen on the end of the stacked assembly in FIG. 5.

Figure 6:
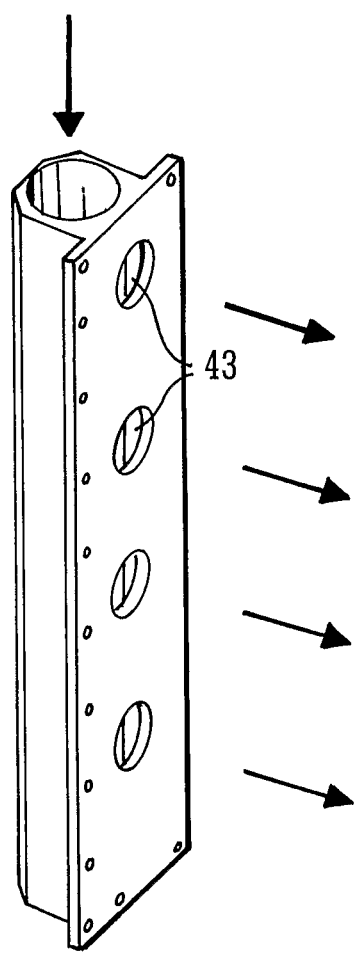
FIG. 6 is a perspective view of a gas manifold used in the apparatus of FIG. 1.

FIG. 6 shows the general structure of the external gas manifolds 11, 13, 15 and 17. Each manifold is connected to the stack of plates such that holes 43 are in communication with alternate internal manifolds on the plate.

Figure 7:
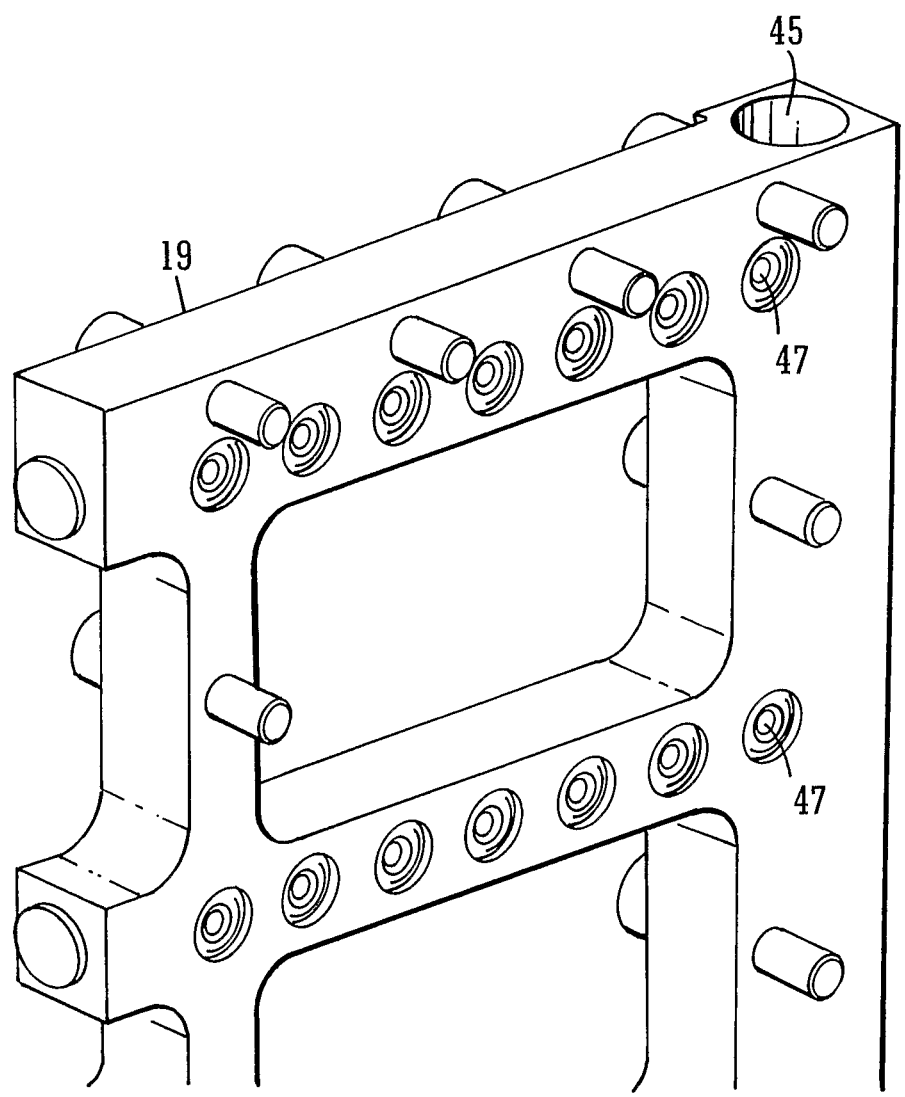
FIG. 7 is a perspective view of an external oil manifold.

The external oil manifold 19 is shown in FIG. 7. Oil entering the inlet 45 can travel to holes 47 and vice versa. In the assembled apparatus, holes 47 are connected to the ends of the oil tubes 29 and 39 such that the oil, manifolds 19 and oil tubes 29 and 39 form a circuit.

In practice a vaporiser is provided (not shown). The vaporiser unit may be in thermal communication with the fluid circuit formed by external manifolds 19 and tubes 29 and 39.

In use, a mixture of methanol and water is vaporised in the vaporiser unit. The integrated apparatus provides the heat necessary to vaporise the fuel and water in this vaporiser unit. The vaporised mixture of water and fuel is then provided to manifold 15.

The methanol and water mixture flows through the conduits formed by aligned internal manifolds 25b and 33b. The gas then flows over the surface of the reformer plates 3 and therefore over the reformer catalyst 27 such that a reforming reaction takes place:

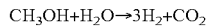

$$CH_3OH+H_2O \rightarrow 3H_2+CO_2$$

The gas flows over each of the reformer plates 3 in the stack in parallel. This minimises flow resistance.

The reformer product stream comprising hydrogen then exits the stack of plates via the tubes formed by the internal the manifolds 25b and 35b on the opposite side of the reformer plate 3 and exits the apparatus via the external outlet manifold 17. Hydrogen produced by the reforming reaction and exiting the apparatus via the external manifold 17 may be fed into a hydrogen powered fuel cell.

At the same time as the reforming reaction is taking place, combustible hydrogen-rich fuel from the outlet of a fuel cell (not shown) is introduced to the mixer inlet 9 whilst air is drawn in via the inlet 7. The fuel and air is mixed in the fuel mixer 5 and directed to the external combustible fuel manifold 11. The fuel and air mixture flows through the tubes formed by the alignment of internal manifolds 25a and 33a. The gas then flows over the surface of the combustion plates 1 and thus the combustion catalyst 31, where combustion takes place. The gas flows over all of the combustion plates 1 in parallel. The combustion product stream flows out of the apparatus via the tube formed by the internal manifolds 25a and 33a on the opposite side of the plates 1 to the inlet, and then out via the exhaust manifold 13.

As the combustion and reforming reactions are taking place, oil is circulated through the oil circuit formed by external manifolds 19 and the tubes 29 and 39. The temperature of the oil is chosen such that the reaction temperatures can be controlled.

Close control of the reaction temperatures can be achieved either by maintaining the fluid at a constant temperature and varying the flow rate of the fluid through the circuit, or by maintaining a constant flow rate through the circuit and varying the fluid temperature.

Although the above embodiment has been described with reference to a reforming reaction using methanol as a reforming fuel, the apparatus of the invention can also be used for reforming reactions using alternative fuels such as methane, natural gas or diesel. In this case, the temperature of the reforming reaction is higher than the temperature of the methanol reforming reaction. The apparatus shown could therefore be made of steel, for example, or any other material that is suitable for use at higher temperature. A fluid suitable for use in the additional circuit would be potassium, but any other fluid suitable for use at higher temperatures could be used instead.

The invention claimed is:

1. A method of preparing hydrogen from fuel and water using an integrated reformer and combustion apparatus, said apparatus comprising:

a reformer inlet to the apparatus, a reformate outlet from the apparatus, and a reformer unit in which a reforming reaction can take place, the apparatus defining a reforming-reaction flow path through the apparatus from the reformer inlet, through the reformer unit, to the reformate outlet;

a combustible-fuel inlet to the apparatus, an exhaust outlet from the apparatus, and a combustion unit in thermal communication with the reformer unit, in which a combustion reaction can take place, the apparatus defining a combustion-reaction flow path through the apparatus from the combustible-fuel inlet, through the combustion unit, to the exhaust outlet; and a temperature-control fluid inlet to the apparatus, a temperature-control fluid outlet from the apparatus, and a temperature-control fluid circuit from the temperature-control fluid inlet to the temperature-control fluid outlet, wherein the temperature-control fluid circuit is separate from the reforming-reaction and combustion-reaction flow paths, and is in thermal communication with at least one of said reformer unit and said combustion unit so as to allow the temperature of said unit to be controlled, said method comprising: passing a reformer feedstock comprising fuel and water through the reformer unit such that a reforming reaction takes place to produce a reformer product stream comprising hydrogen, and simultaneously passing a combustible feedstock through the combustion unit such that combustion takes place to produce a combustion product stream, wherein the combustion provides heat for the reforming reaction, and controlling temperature by circulating a fluid through the temperature-control fluid circuit;

said method further comprising the step of circulating a fluid through the temperature-control fluid circuit, said fluid having a temperature between 150 and 250° C.;

wherein the fuel for the reforming reaction comprises methanol and said fluid comprises oil.

2. A method as claimed in claim 1 wherein the apparatus comprises at least one reformer plate and at least one combustion plate arranged in a stack such that the reformer plates and combustion plates are interspersed, the temperature-control fluid circuit being in thermal communication with at least one of said reformer plate and said combustion plate; said method comprising: passing a reformer feedstock comprising fuel and water over the reformer plate such that a reforming reaction takes place to produce a reformer product stream comprising hydrogen, and simultaneously passing a combustible feedstock over the combustion plate such that combustion takes place to produce a combustion product stream wherein the combustion provides heat for the reforming reaction.

3. A method as claimed in claim 2 wherein the temperature-control fluid circuit comprises at least one tube that extends along at least part of the length of at least one plate.

4. A method as claimed in claim 3 wherein the temperature-control fluid circuit comprises tubes that extend along at least part of the length of at least one combustion plate and at least one reformer plate.

5. A method as claimed in claim 4 wherein each plate comprises at least one tube that forms part of the temperature-control fluid circuit.

6. A method as claimed in claim 1 wherein said fluid has a temperature of 180-200° C.

7. A method as claimed in claim 1 wherein the temperature-control fluid circuit comprises at least one conduit comprising a thermal transfer surface in thermal communication with an inner wall of the conduit.

8. A method as claimed in claim 7 wherein said thermal transfer surface comprises one or more webs extending across the interior of the conduit.

9. A method as claimed in claim 1 wherein the apparatus further comprises a thermal management unit integrated with said temperature-control fluid circuit.

10. A method as claimed in claim 1 wherein said temperature-control fluid circuit is thermally integrated with a fuel cell.

11. A method of preparing hydrogen from fuel and water using an integrated reformer and combustion apparatus, said apparatus comprising:
a reformer inlet to the apparatus, a reformate outlet from the apparatus, and a reformer unit in which a reforming reaction can take place, the apparatus defining a reforming-reaction flow path through the apparatus from the reformer inlet, through the reformer unit, to the reformate outlet;
a combustible-fuel inlet to the apparatus, an exhaust outlet from the apparatus, and a combustion unit in thermal communication with the reformer unit, in which a combustion reaction can take place, the apparatus defining a combustion-reaction flow path through the apparatus from the combustible-fuel inlet, through the combustion unit, to the exhaust outlet; and
a temperature-control fluid inlet to the apparatus, a temperature-control fluid outlet from the apparatus, and a temperature-control fluid circuit from the temperature-control fluid inlet to the temperature-control fluid outlet, wherein the temperature-control fluid circuit is separate from the reforming-reaction and combustion-reaction flow paths, and is in thermal communication with at least one of said reformer unit and said combustion unit so as to allow the temperature of said unit to be controlled,
said method comprising: passing a reformer feedstock comprising fuel and water through the reformer unit such that a reforming reaction takes place to produce a reformer product stream comprising hydrogen, and simultaneously passing a combustible feedstock through the combustion unit such that combustion takes place to produce a combustion product stream, wherein the combustion provides heat for the reforming reaction, and controlling temperature by circulating a fluid through the temperature-control fluid circuit;
said method further comprising the step of circulating a fluid through the temperature-control fluid circuit, said fluid having a temperature between 500° C. to 700° C.;
wherein the fuel for the reforming reaction comprises at least one of methane, natural gas or diesel and said fluid comprises potassium.

12. A method as claimed in claim 11 wherein the apparatus comprises at least one reformer plate and at least one combustion plate arranged in a stack such that the reformer plates and combustion plates are interspersed, the temperature-control fluid circuit being in thermal communication with at least one of said reformer plate and said combustion plate; said method comprising: passing a reformer feedstock comprising fuel and water over the reformer plate such that a reforming reaction takes place to produce a reformer product stream comprising hydrogen, and simultaneously passing a combustible feedstock over the combustion plate such that combustion takes place to produce a combustion product stream wherein the combustion provides heat for the reforming reaction.

13. A method as claimed in claim 12 wherein the temperature-control fluid circuit comprises at least one tube that extends along at least part of the length of at least one plate.

14. A method as claimed in claim 13 wherein the temperature-control fluid circuit comprises tubes that extend along at least part of the length of at least one combustion plate and at least one reformer plate.

15. A method as claimed in claim 14 wherein each plate comprises at least one tube that forms part of the temperature-control fluid circuit.

16. A method as claimed in claim 11 wherein the temperature-control fluid circuit comprises at least one conduit comprising a thermal transfer surface in thermal communication with an inner wall of the conduit.

17. A method as claimed in claim 16 wherein said thermal transfer surface comprises one or more webs extending across the interior of the conduit.

18. A method as claimed in claim 11 wherein the apparatus further comprises a thermal management unit integrated with said temperature-control fluid circuit.

19. A method as claimed in claim 11 wherein said temperature-control fluid circuit is thermally integrated with a fuel cell.

* * * * *